United States Patent

[11] 3,589,515

| [72] | Inventors | Otto C. Krolopp<br>Chicago, Ill.;<br>Edward S. Wright, Mt. Lebanon, Pa. |
|---|---|---|
| [21] | Appl. No. | 779,829 |
| [22] | Filed | Nov. 29, 1968 |
| [45] | Patented | June 29, 1971 |
| [73] | Assignee | Blaw-Knox Company<br>Pittsburgh, Pa. |

[54] APPARATUS AND METHOD FOR SORTING
2 Claims, 7 Drawing Figs.

| [52] | U.S. Cl. | 209/102 |
|---|---|---|
| [51] | Int. Cl. | B07b 3/04 |
| [50] | Field of Search | 209/84, 92, 102 |

[56] References Cited
UNITED STATES PATENTS

| 3,002,618 | 10/1961 | Derderian | 209/102 |
|---|---|---|---|
| 3,038,605 | 6/1962 | Durand | 209/102 |
| 3,459,301 | 8/1969 | Gray | 209/102 |

*Primary Examiner*—Richard A. Schacher
*Attorney*—Parker, Carter & Markey

ABSTRACT: A sorting apparatus and method for grading or sizing material such as dry agricultural products or wet comestibles, said apparatus being modular in concept whereby a plurality of units differing only in size of sort can be stacked or cascaded to provide multiple sorts, each modular unit having a transfer conveyor for receiving unders material located beneath a live bed conveyor, said transfer conveyor conveying the unders in a direction transverse to the direction of flow of the live bed conveyor to a discharge zone physically separated from the live bed conveyor discharge zone.

INVENTORS.
OTTO C. KROLOPP
EDWARD S. WRIGHT
BY *Parker, Carter & Markey*
Attorneys.

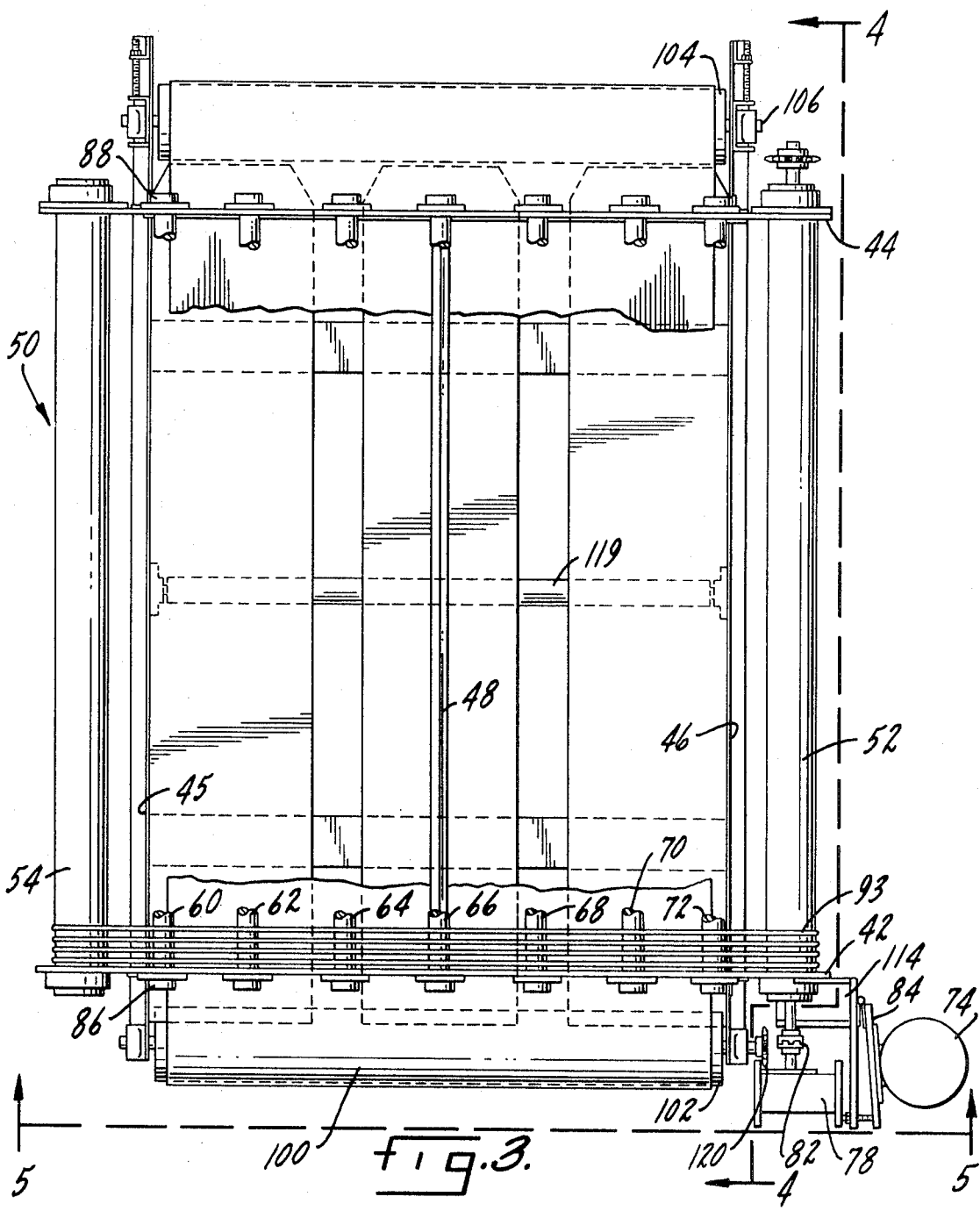

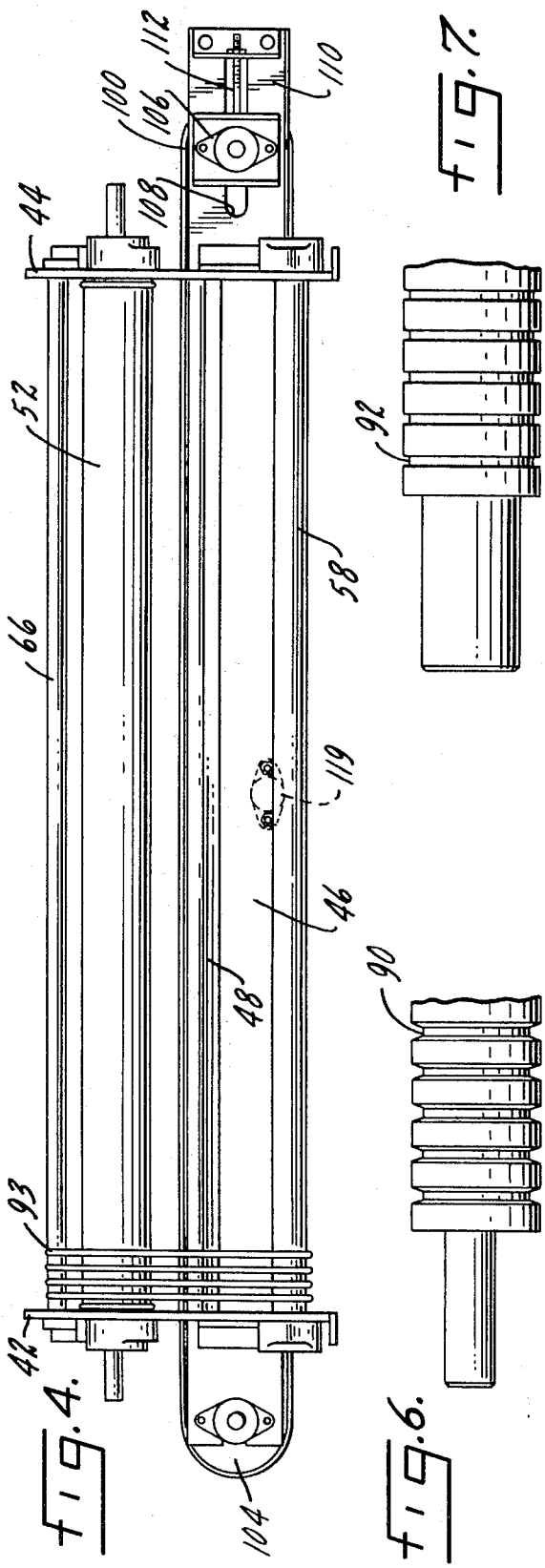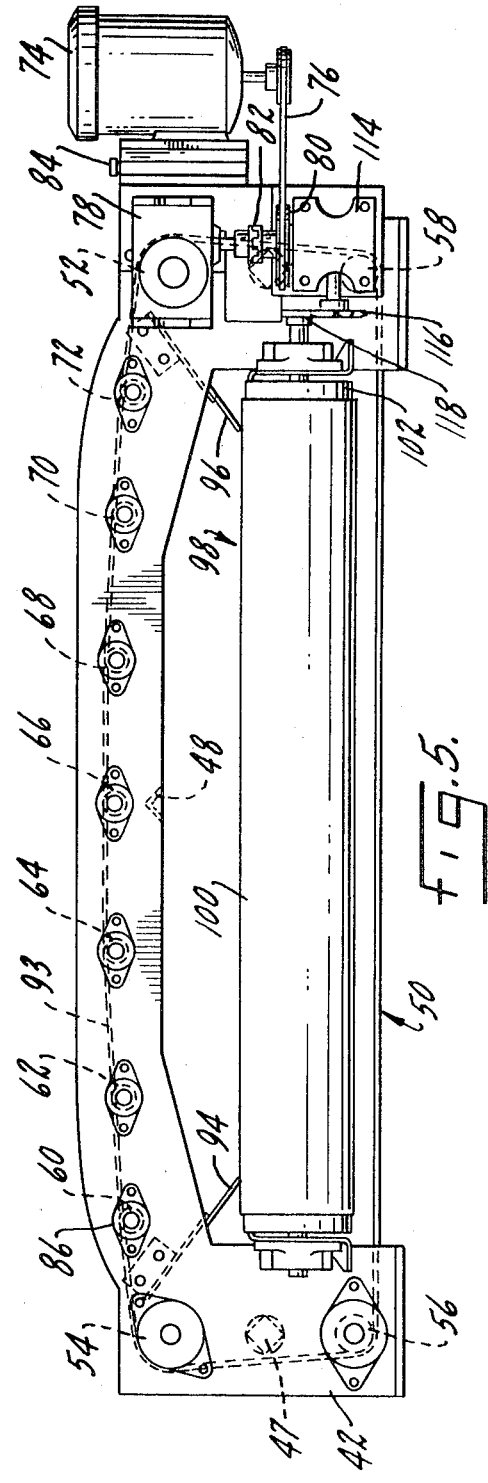

APPARATUS AND METHOD FOR SORTING

BACKGROUND OF THE INVENTION

This invention relates generally to sorting or grading, and specifically to a method and apparatus for the sorting of materials for the purpose of grading to size or separating undesired constituents from a desired product or constituent. The invention may be applied to sorting or grading dry agricultural products such as pickles, peanuts, beans, peas, shelled corn, wheat and lentils in the as-picked condition, or wet products such as shrimp and diced vegetables for stew or soup mixes, for example. From a functional standpoint the invention is well adapted to grade irregularly shaped or elongated products by size or width, though it may also serve as a high-capacity, high-efficiency size grader on more regularly shaped products.

SUMMARY OF THE INVENTION

Accordingly an object of the invention is to provide a method of economically and efficiently grading elongated and/or irregularly shaped products.

Another object is a method of economically and efficiently size-grading substantially regularly shaped products.

Another object is to provide apparatus for economically and efficiently grading elongated and/or irregularly shaped products.

Another object is to provide apparatus for economically and efficiently size-grading substantially irregularly shaped products.

A further object is to provide a modular unit for grading and/or sizing either irregularly shaped or substantially regularly shaped products, which unit can be quickly and easily inserted into and removed from a base frame assembly for inspection, repair, replacement or adjustment.

A further object is to provide a modular unit as described above which can be stacked or cascaded with similar modular units, or modules, to perform multiple grading or sizing operations from one complete passage through a multiple unit.

A further object is to provide a module as above described having its own integral drive unit so that down time due to connection and disconnection to a drive system is minimized.

Yet a further object is to provide a module as above described having product-aligning means for increasing the efficiency of sort, and wiping means for knocking undesired objects such as twigs, rootlets, dirt lumps, stones, etc. from the product being graded or sorted, either of which can be combined in a multiple unit having any desired number of separations, sequence of separations (large or small first), product size or shape and location of discharge points.

Another object is to provide a module as above described which is rugged, has minimal power requirements, and is capable of operation under adverse production conditions such as in dusty environments or in conjunction with an abrasive product mass.

Further objects and advantages of the invention will become apparent from an understanding of the following specific description of the invention.

DESCRIPTION OF THE PREFERRED EMBODIMENT

The invention is illustrated more or less diagrammatically in the following FIGS. wherein FIG. 1 is a perspective view of a multiple-unit assembly which consists of two modules;

FIG. 3 is a top plan view with portions broken away for clarity of a module assembly;

FIG. 4 is a view taken substantially along the line 4—4 of FIG. 3;

FIG. 5 is a view taken substantially along the line 5—5 FIG. 3;

FIG. 6 is a view of a portion of a top idler roll used in a module; and

FIG. 7 is a view of a portion of a bottom idler roll used in a modular unit.

Like reference numerals will be used to refer to like parts from Figure to Figure in the following description of the drawings.

Figure 1:
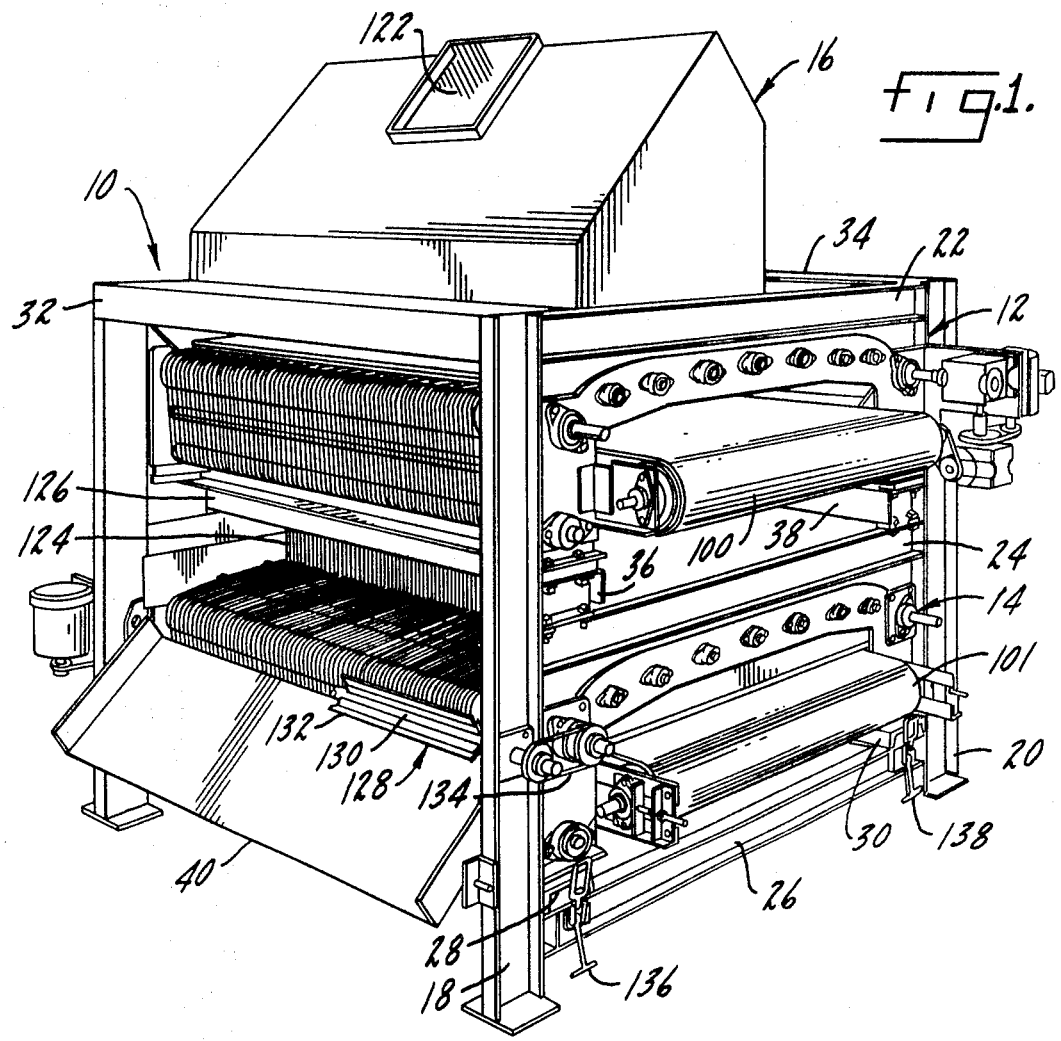

Referring first to FIG. 1, a frame assembly is indicated generally at 10, an upper module assembly at 12, a lower module assembly at 14, and a supply distributor assembly at 16.

The frame assembly consists of a pair of side frame assemblies, each side frame assembly including a pair of corner uprights 18, 20 and three horizontal braces 22, 24 and 26. The side frames are connected by a pair of bottom cross channels 23,30 and a pair of top framing angles 32,34. A pair of upper module support members are indicated at 36,38 these members being bolted or otherwise suitably secured to the intermediate cross brace 24, and a discharge chute at 40.

The modular assemblies 12 and 14 are identical one with the other, except for one variation which will be described hereinafter, and accordingly a description of one will suffice for a description of both. In fact, one of the primary advantages of the invention is the fact that the modular assemblies are identical, and therefore interchangeable, whereby a machine having any desired number of stages may be assembled, and individual stages or modular assemblies may be quickly and efficiently inserted and removed for inspection, maintenance, size adjustment or any other purpose.

Referring now to FIGS. 3, 4 and 5 it will be seen that the main assembly for the module comprises a pair of generally inverted U-shaped side frame members, 42,44 which are maintained in spaced relationship one to the other by attachable crosspieces 45,46, and permanent braces 47 and 48 shown best in FIGS. 3 and 4.

A live bed conveyor is indicated generally at 50, the conveyor comprising a pair of top drive rolls 52, 54, only one of which may be in engagement with a power source at one time, a pair of bottom idler rolls 56, 58, and a plurality of top idler rolls 60 through 72, in this instance 7 being chosen for illustration. Drive roll 52 is powered by motor 74 through belt 76 and speed reducer 78, the input shaft of the speed reducer being coupled to the sprocket 80 by coupling 82. As best seen in FIGS. 3 and 5, the motor is connected to side frame 42 by bracket 84 and speed reducer 78 is bolted directly to the side frame 42. Alternately, only a power connection could be provided for drive roll 52, which connection would be connectable to a power source located at a station remote from the module.

Each of the idler rolls is supported from the side frames 42, 44 by suitable bearing assemblies 86, 88 and each roll is formed with a plurality of grooves for the reception of beltlike elements which form the live bed of the conveyor. A portion of a top idler roll is indicated in FIG. 6 wherein it will be seen that the body of the roll has a plurality of grooves 90 formed therein. Each of the bottom idler rolls, a portion of one being illustrated in FIG. 7, likewise has a plurality of grooves 92 formed in the body portion thereof. In this instance the beltlike elements are polyurethane cord belts 93, though it is contemplated that other materials could be used. It will be noted however that the grooves in the bottom rolls are of a lesser depth than the grooves of the top roll to facilitate the drive of the belts. Side baffles are indicated at 94, 96.

Material which drops through the carrying surface of live bed conveyor 50 falls onto means for receiving and transferring the material indicated generally at 98. In this instance said means is a belt conveyor which includes flexible belt 100 which passes around driver pulley roll assembly 102 and driven pulley roll assembly 104, best seen from FIG. 4. The tension from belt 100 may be adjusted by moving the driver pulley roll assembly toward and away from the driven pulley roll assembly by means of take up bearing mount 106 which receives the ends of the pulley roll assembly in suitable bearings, and which slides in a slot 108 formed in an extension 110 of frame member 46. A screw-and-nut tension adjustment is indicated generally at 112. The power from sprocket 80 is transmitted to driver pulley roll assembly 102 by means of speed reducer 114. Output sprocket 116 in turn drives belt 118 which engages the input sprocket 120 carried by an extension of the driver pulley roll assembly shaft. An idler roll is indicated at 119 which may be used to elevate the return run of the conveyor belt.

The supply distributor assembly 16 may be formed of sheet metal with a suitable inlet aperture 122 and, if desired, suitable baffles for distributing material fed into inlet 122 at the inlet end of the live bed conveyor.

Means for agitating material on the live bed conveyor, and aligning the material to facilitate passage of the material through the open spaces between the belts is indicated best at 124. In this instance the agitating means is merely a series of dangle weights which are loosely supported for swinging movement in all directions from a T-bar 126 which is carried by suitable slots or other securing means in side pieces 22 and 24. It should be understood that within the scope of the invention the design and support of the dangle weights may vary within wide limits, the primary purpose of said weights being to cause the material carried on the live bed conveyor to be oriented in such fashion that its downward passage through the open spaces between the belts is facilitated. Any number of dangle weight T-bar 126 may be employed, the number used being within the skill of the art and governed to some extent at least by the type of product being processed.

Means for separating undesired constituents from the product being sorted, such as rootlets, twigs, grass, clumps of dirt and so forth is indicated at 128. In this instance said means consists of a paddle wheel shaft having a plurality of flanges projecting radially outwardly therefrom. Each flange 130 has secured thereto by any suitable means a rubber lip or flange 132 of a length sufficient to strike against and be depressed by the belts on the lower modular assembly. The shaft is driven by belt 134 which derives its power from a sprocket on an extension of a top idler roll assembly shaft. The cleaning means may rotate either with or in opposition to the direction of rotation of the adjacent top idler roll pulley.

The use and operation of the invention is as follows.

A machine having any desired number of grades or sorts may be built-up utilizing a basic frame assembly and any desired number of modular units. In this instance a machine having two modular units has been chosen for illustration, thereby providing three sorting or grading operations, but it should be understood that it is within the skill of the art to provide any suitable number of modules and thereby any suitable number of grading operations.

Starting from a disassembled condition, a module may be lifted by any suitable means, such as a fork lift truck, and slid into place on either the bottom cross channels 28,30, or on a pair of upper module support members 36,38. In either event, once in position, the module is quickly and efficiently locked in place by quick-acting clamp assemblies 136, 138.

The modules may be assembled so that the size of sort commences with either the smallest first or the largest first. That is, the spacing between the polyurethane cord belts in the upper module assembly 12, may be either more widely or less widely spaced than the corresponding distances between the cord belts in the lower module assembly 14. In any event a portion of the material fed to the delivery zone at the left end of the live bed conveyor as indicated in FIG. 2 will pass through the conveyor and fall onto the takeaway means, in this instance takeaway conveyor 98, which removes the material at right angles to the direction of movement of the material on live bed conveyor 50.

Figure 2:
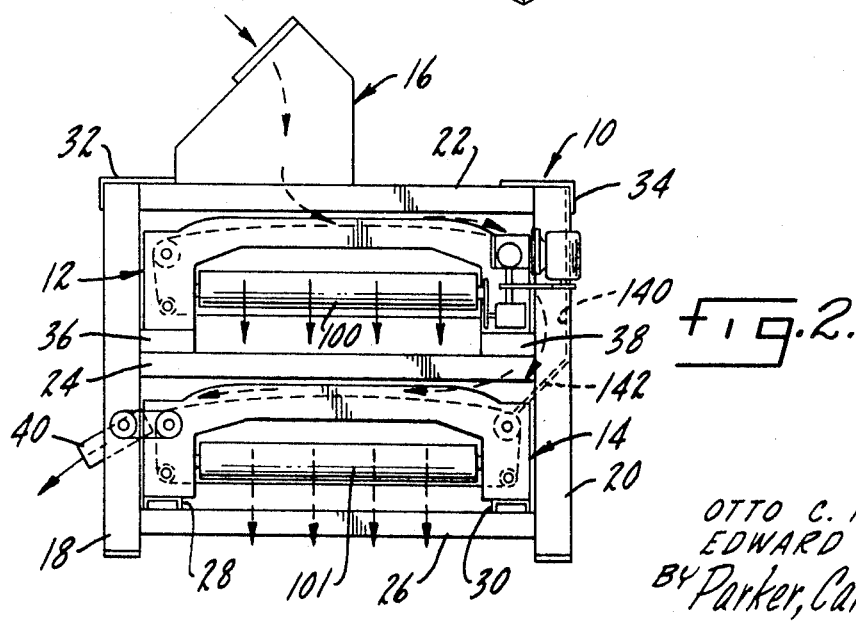
FIG. 2 is a flow diagram illustrating one possible mode of flow of material through a two-module unit of the type shown in FIG. 1.

Referring specifically to FIG. 2, material entering through inlet 122 in supply distributor assembly 16 is deposited on the moving, live bed of live bed conveyor 50. Assuming that the spacing between the polyurethane cord belts in the upper module assembly 12 is narrower than the spacing of the lower module assembly 14, it will be seen that as the material moves toward the right as viewed in FIG. 2, the undersized material, hereinafter referred to as unders, will fall through the polyurethane cord belts onto the takeaway conveyor belt 100.

In effect, the material fed to the left end of the live bed conveyor divides into two streams of material, the first stream having a flow path which is formed by the direction of movement of the cord belts in upper module assembly 12, and the lower stream being formed by the conveyor belt 100. The lower stream of course is formed by the passage of the unders material through the live bed conveyor belts.

The unders material which falls onto conveyor belt 100 may be conveyed to the right side of the machine where it is deposited at a discharge zone. The overs from the live bed conveyor 50 are discharged against a baffle structure 140. The baffle terminates in an inclined distributing chute 142 which directs the material onto the right end of the live bed conveyor of lower module assembly 14. As the material is moved to the left, as viewed in FIG. 1, the oversized material, that is the material having a minimal width dimension which is larger than the spacing between the belts in lower module assembly 14, will be carried to the left as a first stream and discharged at a discharge zone represented by chute 40.

During movement of the material over the live bed conveyor of module 14, the unders will fall through the live bed thereby forming a second stream in the second stage, which stream is conveyed at right angles to the movement of the first stream by the conveyor belt 101 in the lower module assembly.

During the time the material passes over the live bed conveyor in each stage or module, it may be subjected to the distributing and levelling effect of the free-swinging dangle weights 124, or suitable equivalent means which serve to orient the product length wise with respect to the openings between the belts, thus assuring maximum exposure of the product to the openings.

Likewise, when sorting some materials which have a large percentage of undesirable constituents, such as peanuts in the as-picked condition, it may be very desirable to further incorporate the cleaning mechanism indicated generally at 128 in FIG. 1. By using a flexible material such as the rubber flanges 132, sufficient force is applied to the conveyed material to separate the undesirable constituents, such as rootlets, from the product undergoing sort, yet there is no possibility of crushing the product or snapping belts because of entrapment of the product between the belt and the pulley roll.

Although a preferred embodiment of the invention has been illustrated and described, it will be apparent to those skilled in the art that various modifications may be made within the skill of the art. Accordingly, it is intended that the scope of the invention be limited not by the scope of the foregoing description, but solely by the hereinafter appended claims when interrupted in light of the pertinent prior art.

We claim:

1. A sorting apparatus including:

a plurality of orbitally movable plastic cord belts disposed to form a live bed carrying surface for material to be sorted, said plastic cord belts being disposed substantially parallel to one another, there being an open space between adjacent plastic cord belts to enable passage therethrough of material having a dimension less than the distance adjacent plastic cord belts, grooved roller means supporting the plastic cord belts along that portion of the orbital path of the plastic cord belts in which sorting occurs, means for enabling unidirectional movement to be imparted to said plastic cord belts, takeaway means for receiving undersized material which passes through the aforesaid open spaces and transferring said unders to a remote discharge zone, said takeaway means including an unbroken surface disposed beneath the live-bed-carrying surface formed by the plastic cord belts with the surface of the takeaway means disposed within the orbital path of the plastic cord belts, and means for separating usable products from waste material, said means including a revolving member adjacent to the plastic cord belts of the live-bed-carrying surface, said revolving member having a depressable portion disposed to wipe against the plastic cord belts and the material carried thereon to exert a shearing or tearing of the usable product from the associated waste material.

2. The apparatus of claim 1 further characterized by means supporting the aforesaid components as a modular unit with said modular unit formed and adapted to be assembled in stacked relation with similar modular units to form a sorting assembly capable of performing multiple sorts.